United States Patent
Escobar Benavides et al.

(10) Patent No.: US 8,157,213 B2
(45) Date of Patent: Apr. 17, 2012

(54) INTEGRATED COMPOSITE SKIN FOR AIRCRAFT MID-BOX LIFTING SURFACES

(75) Inventors: Francisco de Paula Escobar Benavides, Madrid (ES); Daniel Claret Viros, Madrid (ES); Jose Cuenca Rincon, Madrid (ES)

(73) Assignee: Airbus Espana, S.L., Madrid (ES)

( * ) Notice: Subject to any disclaimer, the term of this patent is extended or adjusted under 35 U.S.C. 154(b) by 1035 days.

(21) Appl. No.: 11/651,404

(22) Filed: Jan. 9, 2007

(65) Prior Publication Data

US 2010/0230541 A1 Sep. 16, 2010

(30) Foreign Application Priority Data

Oct. 31, 2006 (EP) .................................. 06381047

(51) Int. Cl.
  *B64C 3/24* (2006.01)
(52) U.S. Cl. .................. 244/123.1; 244/123.7
(58) Field of Classification Search .... 244/123.1–123.5, 244/123.7, 123.13, 133
  See application file for complete search history.

(56) References Cited

U.S. PATENT DOCUMENTS

| | | | | |
|---|---|---|---|---|
| 3,490,983 A | * | 1/1970 | Lee | 428/113 |
| 3,768,760 A | * | 10/1973 | Jensen | 244/123.3 |
| 3,780,969 A | * | 12/1973 | Nussbaum et al. | 244/123.3 |
| 3,910,531 A | * | 10/1975 | Leomand | 244/123.13 |
| 4,641,796 A | * | 2/1987 | Feifel | 244/123.7 |
| 4,662,587 A | * | 5/1987 | Whitener | 244/123.3 |
| 4,741,943 A | * | 5/1988 | Hunt | 244/123.3 |
| 5,735,486 A | * | 4/1998 | Piening et al. | 244/133 |
| 6,190,484 B1 | * | 2/2001 | Appa | 244/123.7 |
| 6,561,459 B2 | * | 5/2003 | Amaoka et al. | 244/123.7 |
| 6,655,633 B1 | * | 12/2003 | Chapman, Jr. | 244/133 |
| 6,908,526 B2 | * | 6/2005 | Bequet | 156/189 |
| 7,182,293 B2 | * | 2/2007 | Sarh | 244/123.7 |
| 7,837,148 B2 | * | 11/2010 | Kismarton et al. | 244/123.1 |
| 7,851,040 B2 | * | 12/2010 | Victorazzo | 428/110 |
| 2003/0098116 A1 | | 5/2003 | Bequet | |

FOREIGN PATENT DOCUMENTS

EP  0 230 682 A2  8/1987
FR  2.202.809  5/1974

* cited by examiner

*Primary Examiner* — Galen Barefoot
(74) *Attorney, Agent, or Firm* — Ladas & Parry LLP

(57) ABSTRACT

A composite skin (11) with swept angle and dihedral for an aircraft mid-box lifting surface having a left side (5), a right side (7) and a central transition area (9) where both sides meet, that is designed and manufactured as a single part from left tip to right tip following a common ply structure for the whole part defined in relation to a single orientation rosette (25). The invention also refers to a composite aircraft mid-box lifting surface including an upper and lower panel with said composite skin (11).

9 Claims, 3 Drawing Sheets

INTEGRATED COMPOSITE SKIN FOR AIRCRAFT MID-BOX LIFTING SURFACES

FIELD OF THE INVENTION

The present invention refers to a composite skin for an aircraft mid-box lifting surface made as a single part and to an aircraft mid-box lifting surface comprising said skin in its upper and lower panels.

BACKGROUND OF THE INVENTION

Current lifting surface architectures for jetliners consist of 2 swept torsion boxes (right and left sides) with a central joint at the aircraft centreline. Eventually, a central torsion box is used instead of a central joint depending on the aircraft architecture.

In classic metallic structures, the skins of such torsion boxes were manufactured with a number of riveted foils.

In modern aircraft, thanks to the contribution of composites to parts integration, those skins can be single composite parts from the central joint to the tip. In other words, current state-of-art allows having only 4 full-size skins to produce left and right torsion boxes (2 upper skins and 2 lower ones). A central joint (or central torsion box) is still used to fix both sides to the aircraft fuselage or body.

There are known some proposals of single parts for aircraft lifting surfaces. In this respect US 2003/0098116 A1 discloses a stabilizing element comprising two portions in which the principal directions intersect at a non-singular angle which is manufactured by a continuous lay-up operation on both parts using two lay-up coordinate systems (one for each portion). This proposal seems to be applicable to small sized lifting surfaces (stabilizers for helicopters or sport airplanes for example).

The aircraft industry demand continuously a higher degree of design optimisation of typical airliners' lifting surface architectures (multi-rib or multi-spar) driving to both cost and weight reduction.

The present invention is intended to satisfy this demand.

SUMMARY OF THE INVENTION

It is an object of the present invention to provide skins manufactured as single parts from tip to tip (1 upper and 1 lower skins with swept angle and dihedral) for multi-rib or multi-spar mid-boxes as a step beyond in parts integration applied to torsion boxes of aircraft lifting surfaces.

It is another object of the present invention to provide aircraft lifting surfaces with important savings removing the central joint, while keeping an architecture that could be detached if needed (maintainability, reparability) what is not strange for airliners. In other words, an object of this invention is to provide a single mid-box for both sides (with stringers, spars and/or ribs to be added subsequently) instead of left and right torsion boxes.

It is another object of the present invention to provide aircraft lifting surfaces easier to manufacture and assemble.

These and other objects of the present invention are met in one aspect by a composite skin with swept angle and dihedral for an aircraft mid-box lifting surface having a left side, a right side and a central transition area where both sides meet, that is designed and manufactured as a single part from left tip to right tip following a common ply structure for the whole part defined in relation to a single orientation rosette.

In another aspect, the invention defines a composite lifting surface build-up, even for high swept angle, by a single upper panel and a single lower panel, having continuous composite skins from left tip to right tip. The single panel concept might allow having a detachable structure configuration (sometimes suitable for airliners) both for multi-rib or multi-spar architectures if desired.

From the manufacturing and assembly side important advantages are encountered. The central transition area will reduce its thickness, as no box joint exists. This, combined with laying both sides as a single panel, optimises lead times and reduces the amount of material needed. On the other side, a massive central joint is reduced, simplifying the assembly of the component.

Other characteristics and advantages of the present invention will be clear from the following detailed description of embodiments illustrative of its object in connection with the attached figures.

DETAILED DESCRIPTION OF THE INVENTION

Figure 1:
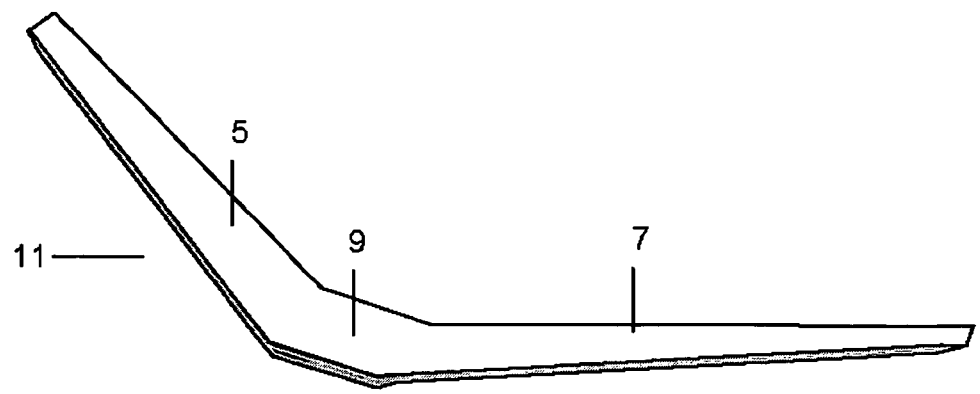
FIG. 1 shows a perspective of a single panel upper cover of a horizontal tail plane mid-box (with sweep angle and dihedral).
Figure 2A:
FIGS. 2a and 2b shows 2D top and front views of the same single panel upper cover of a horizontal tail plane mid-box.
Figure 2B:
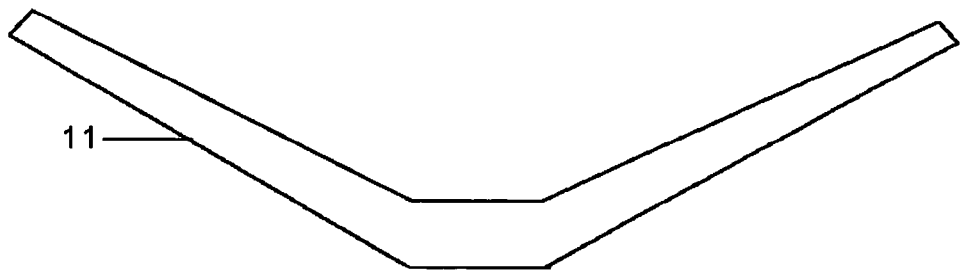

In a preferred embodiment of the invention the upper skin or lower skin of the mid-box is a single part 11 from left tip to right tip in composites with fully integrated design.

The resulting composite skin 11 could be considered having three different areas: left and right sides 5, 7 with its integrated design according to the stress needs and a central transition area 9 where the two sides meet.

An important amount of plies is shared by left and right sides 5, 7. The remaining plies are dropped-off conveniently at the central transition area 9.

In addition to part count reduction and contribution to integration, this concept allows weight savings by removing the need for a massive central joint to fix left and right torsion boxes of classic configurations, while keeping architecture able to be detached if needed.

In a preferred embodiment carbon fibre composites will be used for manufacturing these skins.

The main driver of this invention has been to bring into line the individual orientations that are encountered on multi-box designs for skins.

Typically, in lifting surfaces, the 0° orientation is parallel or close to the main load paths, i.e. the left rear and front spars 13, 15 and the right rear and front spars 17, 19 or to a direction in-between. Accordingly in the known art the left side 5 of skin 11 would be laid-up according to the orientation rosette 21 represented in a dot line and the right side 7 of skin 11 would be laid-up according to the orientation rosette 23 represented in a broken line.

Analysing sweep angles of the spars of lifting surfaces currently used for jetliners, a new global orientation reference can be defined in order to lay-up both sides on a single shot while being compatible with main load paths.

Figure 3:
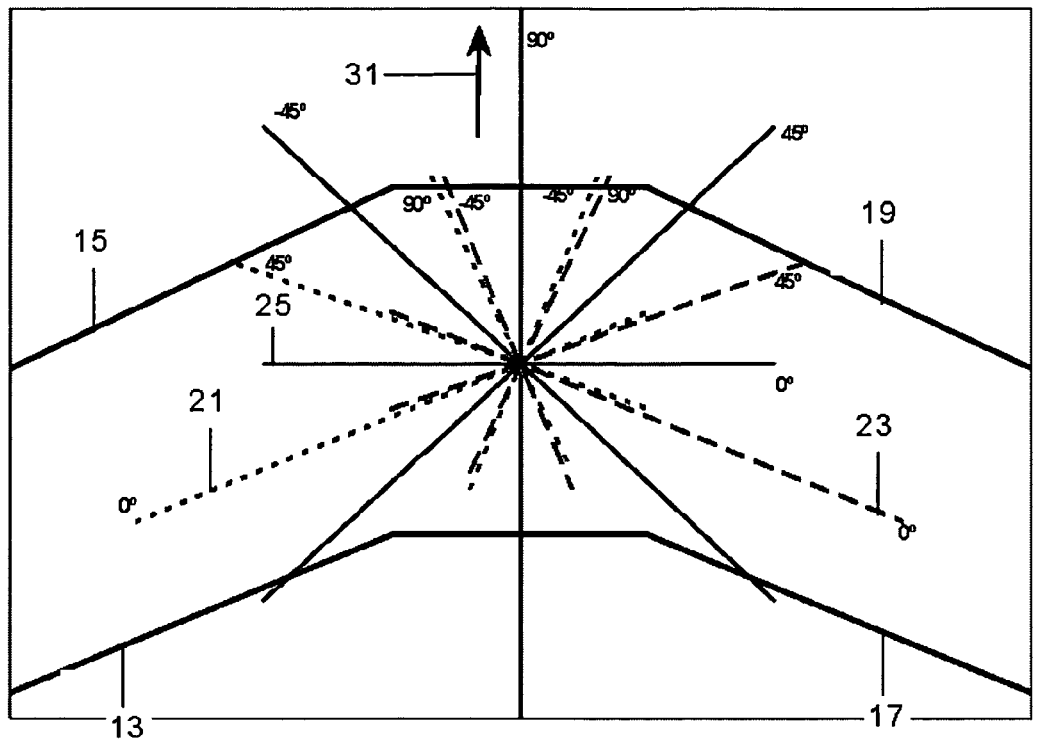
FIG. 3 shows a top-view sketch of a lifting surface mid-box (left and right) represented by its spars with alternative ply orientation rosettes.

Therefore, both sides 5, 7 of skin 11 will have the same rosette 25. In a preferred embodiment of the invention, the 90° direction of the global orientation reference 25, in continuous stroke in FIG. 3, matches with the flight direction 31, but this is an arbitrary criteria. Any other reference could also be convenient.

A proper lay-up design (that changes the traditional aircraft nomenclature of 0°, +45/−45 and 90° for composite components) optimises laminates at both sides (obtaining equivalent properties of the skins to the multi-box concept) while having a transition area (around the centreline) where the two laminates meet.

In a preferred embodiment of the invention, in order to have proper flight conditions, left and right stacking sequences are symmetrical with regard to the aircraft longitudinal axis 31.

The global orientation reference 25 allows having an important amount of plies shared between left and right sides 5, 7. Those that are not common for the two sides 5, 7 are dropped-off conveniently for an optimized design in the central transition area 9. The invention can be applied to unidirectional (UD) or fabric composite pre-impregnated tapes or to any kind of dry textiles.

In a preferred embodiment of the invention prepreg UD tape will be used as raw material of skin 11.

To be understood as a mere illustration, FIGS. 4a to 4d define the principle of the invention here described according to a preferred embodiment, where a chosen rosette 25 allows laminating a certain stacking sequence and sharing carbon tape plies between left and right sides 5, 7 of skin 11.

Figure 4A:
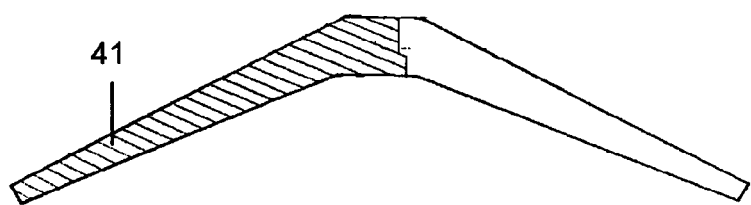
FIG. 4a shows a sketch of the single skin with a first ply laid only on the left side.
Figure 4B:
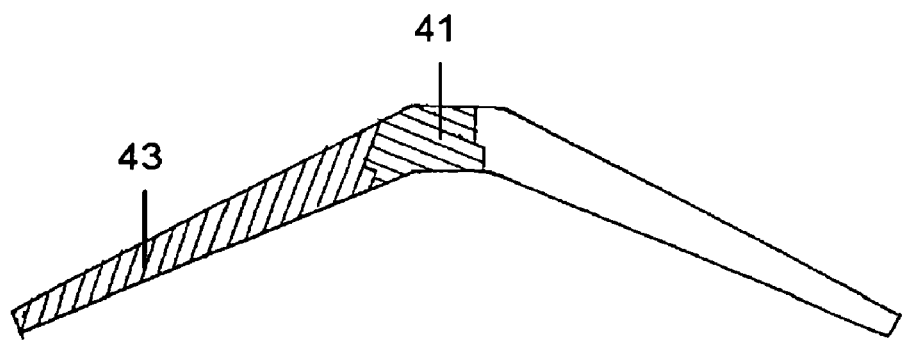
FIG. 4b shows a sketch of the single skin with a second ply being laid only on the left side over the previous first ply in this case.
Figure 4C:
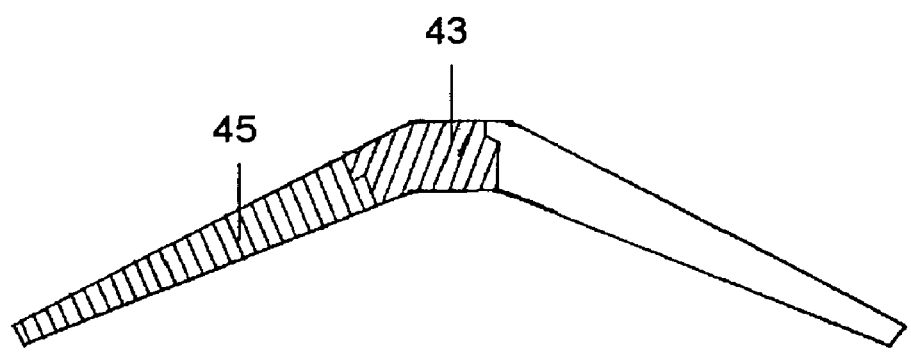
FIG. 4c shows a sketch of the single skin with a third ply being laid only on the left side over the previous second ply in this case.

FIGS. 4a to 4c show different plies being laid that only belong to the left side 5. FIG. 4a shows a first ply 41 laid only on the left side 5 (a −45° ply according to orientation rosette 21). FIG. 4b shows a second ply 43 being laid only on the left side 5 (a +45° ply according to orientation rosette 21) over the previous first ply 41. FIG. 4c shows a third ply 45 being laid only on the left side 5 (a 90° ply according to the orientation rosette 21) over the previous second ply 43.

Figure 4D:
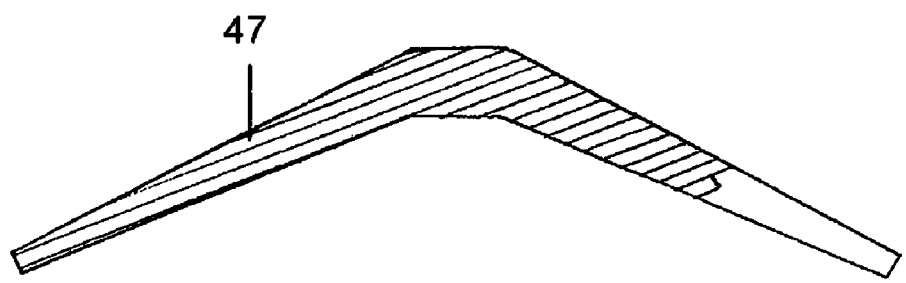
FIG. 4d shows a sketch of the single panel with a fourth ply being laid over the third one on the left side, and being the first one on the right side. This is the first continuous ply in this case.

FIG. 4d shows a fourth ply 47 being laid over the third one 45 on the left side 5 (a 0° ply according to the orientation rosette 21) and being the first one on the right side 7 (a −45° ply according to the orientation rosette 23). This is the first continuous ply in this case.

The central transition area 9 has to be wide enough to ensure proper paths of the lay-up device while laying the plies. Therefore, a smooth transition area is required at the centreline of the skin 11. Ply drop-offs in the central transition area 9 are performed in a way to optimise the design (in terms of reinforcements for ribs and/or spars attachments and/or for loading reasons).

Therefore, in a preferred embodiment the lay-up device would lay plies from one side to the other, being able to cut each ply at the desired position and shape whether it takes place at the transition area or at the outline of the skin.

In another embodiment of the invention, a continuous external ply could be wanted in one surface of the skin (or in both surfaces) to avoid peeling effects. A detailed design would provide the most suitable direction of a UD or fabric composite prepreg tape or a kind of dry textile as continuous external ply.

In a preferred embodiment of the invention, contoured automated tape lay-up (3D ATL) is the chosen technology for manufacturing the single piece skins from tip to tip. Current 3D ATL machines allow deposition of tape onto a tool with a surface of similar shape of the final skin with the double curvature encountered as the addition of the skin's camber and the dihedral of the lifting surface.

A subsequent autoclave cycle would be used to cure the part. Skins can be co-cured, co-bonded, secondary bonded or riveted to stringers and/or spars and/or ribs.

Other composite processing techniques like resin infusion/injection of dry stacking sequences placed in open or closed moulds or others would also be suitable for the manufacturing of those skins.

Modifications may be introduced in the preferred embodiment just set forth, which are comprised within the scope defined by the following claims.

The invention claimed is:

1. A composite skin for an aircraft mid-box lifting surface defining swept and dihedral angles and including a left side, a right side and a central transition area where the left and right sides meet, the composite skin comprising:
   at least one ply extending from a first tip of the lifting surface on one of the two sides to a position in the central transition area, and
   a further ply overlaying the at least one ply, wherein the further ply is a continuous ply which extends from the first tip to a second tip of the other of the two sides of the lifting surface to form a composite skin having a common ply structure; and
wherein said skin has been manufactured as a single structure following a common ply structure for the whole part defined in relation to a single orientation rosette.

2. A composite skin according to claim 1, wherein the common ply structure includes continuous plies shared by said left and right sides and non-continuous plies that are dropped-off at said central transition area.

3. A composite skin according to claim 1, wherein the stacking sequences of said left and right sides are symmetrical with regard to the aircraft longitudinal axis.

4. A composite skin according to claim 1, further comprising an external continuous ply in at least one of its surfaces.

5. A composite skin according to claim 1, wherein the composite skin is made of a material including carbon fibers impregnated with thermoset resin.

6. A composite aircraft mid-box lifting surface including an upper and lower panel having left and right sides, wherein the skin of said panels are made of a composite skin according to claim 1.

7. A composite skin according to claim 1, wherein the at least one and the further plies are laid with reference to global orientation reference so as to be compatible with main load paths of the left and right sides.

8. A method for manufacturing a composite skin according to claim 1, comprising the steps of:
   laying the at least one ply from the first tip to the central transition area, and
   laying the further ply over the at least one ply continuously from the first tip to the second tip.

9. A method for manufacturing a composite skin according to claim 1; further comprising selecting a global orientation reference such that the first and second plies are laid in an orientation that is compatible with main loading paths of the left and right sides.

* * * * *